Nov. 26, 1968 P. H. LANDIS 3,412,673

AUTOMATIC CULINARY SPRINKLER APPARATUS

Filed Oct. 22, 1965 — 2 Sheets-Sheet 1

INVENTOR.
Peter H. Landis
BY Hooper, Leonard & Buell
his Attorneys

Nov. 26, 1968   P. H. LANDIS   3,412,673
AUTOMATIC CULINARY SPRINKLER APPARATUS
Filed Oct. 22, 1965   2 Sheets-Sheet 2

INVENTOR.
Peter H. Landis

United States Patent Office 3,412,673
Patented Nov. 26, 1968

3,412,673
AUTOMATIC CULINARY SPRINKLER APPARATUS
Peter H. Landis, 142 Gulf Bldg., Pittsburgh, Pa. 15219
Filed Oct. 22, 1965, Ser. No. 501,788
5 Claims. (Cl. 99—346)

ABSTRACT OF THE DISCLOSURE

A culinary sprinkling apparatus is provided having a closed receptacle receiving liquid from a vessel in which it is placed, level control valve means in said receptacle admitting fluid into the interior thereof from said vessel to a fixed level, a liquid discharge tube delivering fluid from the receptacle to a point spaced above said receptacle and a fluid dispersing member on the top of said tube distributing fluid radially outwardly and downwardly.

---

This invention relates to automatic culinary sprinkler apparatus and more particularly to an automatic sprinkling apparatus for basting meat roasts or brewing large quantities of coffee.

The primary object of the invention is to improve the flavor of meat while it is being roasted.

Another object of the invention is to provide automatic means for controlling the flow of the sprinkling liquid.

A further object of the invention is to provide means for the dispersal of the basting fluid.

I have invented a culinary sprinkling device which is self-starting and fully automatic. I provide a supporting member having a geared motor mounted therein; a vented enclosure having a transparent, domed section; a container adapted to fit over a motor-driven spindle; a liquid-collecting receptacle or basin detachably secured to said container; a liquid discharge tube and an intake cylinder mounted on said receptacle; a floating valve disposed in said intake cylinder; a skewering member; a fluid-dispersing member adapted to fit on the upper end of the discharge tube; and a heating element and a reflector mounted on the supporting member.

Figure 8:
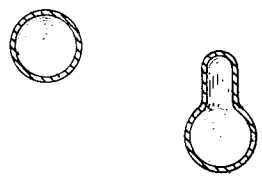

FIGURE 8 presents various forms of a floating valve.

Figure 2:
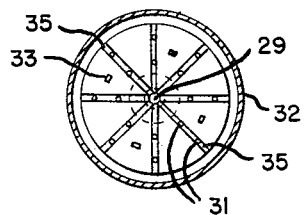
FIGURE 2 is a cross-sectional view of the sprinkler taken on line 2 of FIGURE 1.
Figure 1:
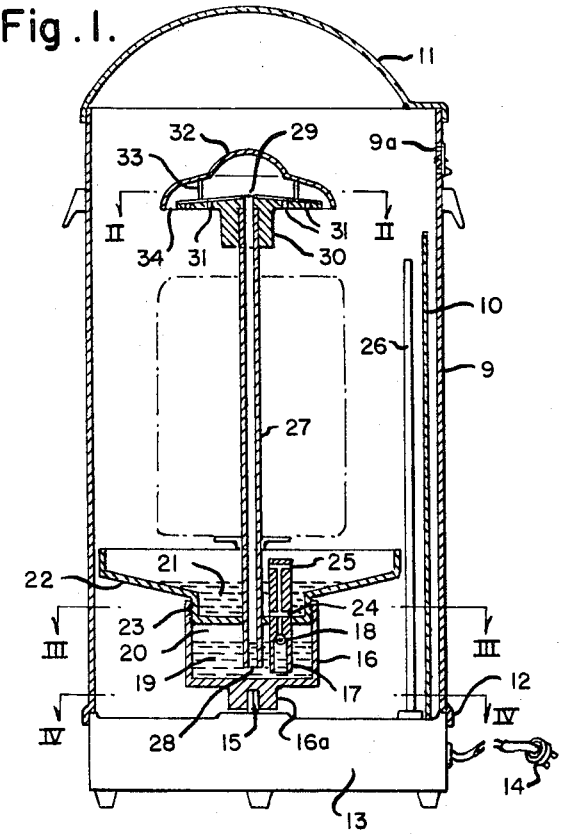
FIGURE 1 is a longitudinal section of the preferred embodiment of the apparatus provided by my invention.
Figure 3:
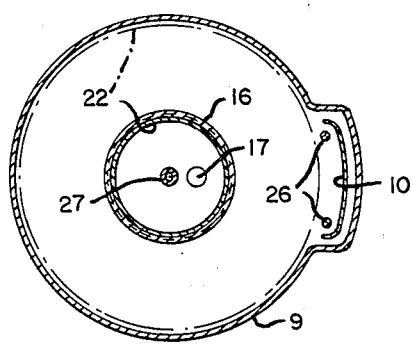
FIGURE 3 is a cross-sectional view taken on line 3 of FIGURE 1.
Figure 4:
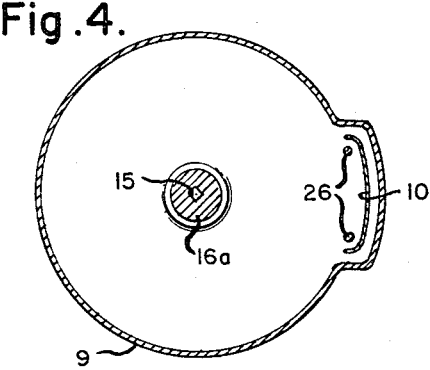
FIGURE 4 is a cross-sectional view taken on line 4 of FIGURE 1.

Referring to the drawings, I have illustrated a rotisserie comprising a supporting member 13 housing a geared motor (not shown) to activate the spindle 15; an enclosure 9 provided with a vent 9a and a transparent section 11; a container 16 adapted to engage and be supported by spindle 15; a liquid-holding receptacle 22 detachably secured to the container 16 by threaded means 23; a liquid-discharging tube 27 mounted on said receptacle; an intake cylinder 17 is provided with apertures 24 and 25 and is also mounted on receptacle 22; a floating valve 18 is positioned in cylinder 17; a detachable, liquid-dispersing member 30 is adapted to slidingly fit over the upper end of the discharge tube 27 and is provided with grooves 35, apertures 29, 31 and 34 and domed cover 32; said domed cover 32 is secured to member 30 by anchoring means 33; a pointed member 36 is adapted to slidingly fit into the upper end of the discharge tube 27 in order to facilitate the skewering of the roast into the position shown by the broken line in FIGURE 1; a heating element 26 and a reflector 10 are mounted on the supporting member 13.

In placing the rotisserie into operation, the following procedure is followed: enclosure 9 and sprinkler 30 are removed and skewering member 36 is fitted into the upper end of the discharge tube 27. After the meat is positioned in the rotisserie as shown by the broken line in FIGURE 1, the skewering member 36 is removed and the sprinkling member 30 is fitted over the upper end of the tube 27; a predetermined amount of basting liquid such as beef broth, chicken broth, or strained onion soup is placed into the receptacle 22. Then enclosure 9 is mounted on the supporting base 13 and the electric conductor 14 is plugged into an electric outlet of the kitchen. The basting fluid will flow through aperture 24 into the container 16. When the basting fluid reaches a predetermined level in the container, the floating valve 18 will stop the flow of liquid thereby creating an air chamber 20. When the liquid in container 16 begins to boil, the resulting increased vapor and air pressure in chamber 20 will force the liquid 19 to flow intermittently through tube 27 and sprinkler 30 thereby basting the meat automatically.

Figure 6:
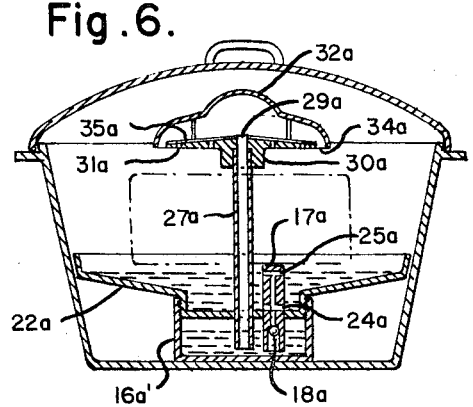
FIGURE 6 is a vertical section through a second embodiment of my invention.
Figure 5:
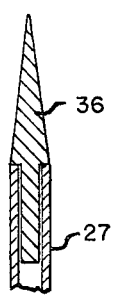
FIGURE 5 is a longitudinal section of a skewering member.

In FIGURE 6 I have illustrated a form of my invention for use in a conventional roasting pan and Dutch oven. In this form a receptacle 22a is provided to be detachably secured to container 16a which rests on the bottom of a roast pan. A liquid discharge tube 27a is mounted through the bottom of said receptacle 22a and extends into container 16a. An intake tube 17a is provided with apertures 24a and 25a and communicates through the bottom of receptacle 22a. A floating valve 18a is positioned in tube 17a within an enlarged opening in the bottom portion thereof. A detachable liquid distributor 30a slidably fits over the top end of tube 27a and is provided with grooves 35a, apertures 29a, 31a, and 34a as well as a spaced domed cover 32a attached by anchor members 33a. The pointed member 36 described in connection with FIGURE 1 is adapted to slidably fit into the open end of tube 27a in order to facilitate the skewering of a roast onto tube 27a, as indicated in dotted line.

Figure 7:
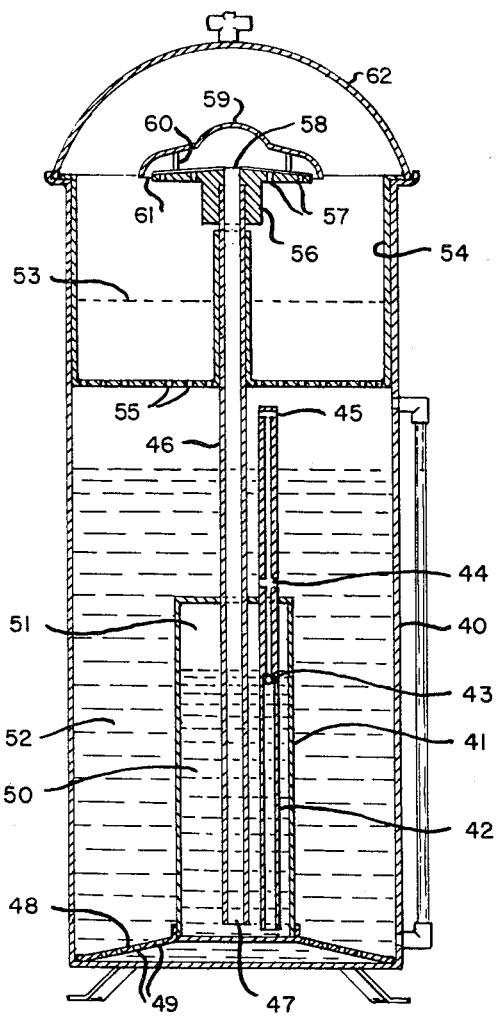
FIGURE 7 is a longitudinal section of a third embodiment of my invention.

In FIGURE 7 I have illustrated a coffee urn 40 in which a modified form of my invention is incorporated. In this embodiment I provide a closed cylindrical receptacle 41 having a vertical valve tube 42 fixed therein and extending through the top wall. The tube 42 is provided with a float valve 43 in the enlarged lower end within cylinder 41 and with apertures 44 and 45 at the opposite end outside cylinder 41. A liquid discharge tube 46 is mounted axially in the top of cylinder 41 and extends vertically above the same. The cylinder 41 is supported in a dished base 48 having passages 49 therein. The upper end of tube 46 passes through a percolator strainer 54 and is provided with a liquid dispersing member 56 adapted to fit over the end. The liquid dispersing member is provided with a dome shaped cover spaced above the member 56 by anchor member 60. The operation of the device is essentially the same as described in connection with FIGURE 1.

From the above description, it is now apparent that the apparatus provided by my invention is novel and useful, it is extremely simple in its operation, comparatively inexpensive to manufacture, it is fully automatic, and requires very little care and attention.

The embodiment illustrated in FIGURE 7 operates in essentially the same fashion as that shown in FIGURE 1, and is very useful in brewing large quantities of coffee in restaurants.

While the invention is susceptible to various modifications and alternative constructions to those I have shown in the drawings and herein described in detail the preferred embodiment, it is to be understood that my invention is not to be limited to the specific form or arrangement of parts herein shown and described but may be otherwise embodied within the scope of the following claims.

I claim:

1. A culinary sprinkling apparatus comprising a closed receptacle adapted to receive liquid from a vessel in which it is placed, floating level control valve means in said receptacle admitting fluid into the interior of the receptacle from said vessel to a fixed level, a pressure chamber in said receptacle created by said floating valve, a liquid discharge tube delivering fluid from said receptacle to a point spaced above said receptacle, heating means for said receptacle, and a fluid dispersing member on the top of said tube distributing fluid radially outwardly and downwardly from said tube.

2. A culinary sprinkler as claimed in claim 1 having a pointed member interchangeable with the fluid dispersing member for opening a passage for said member through an article to be cooked and sprinkled to receive said tube.

3. A culinary sprinkling apparatus as claimed in claim 1 having a fluid collecting member on the top of said receptacle collecting fluid for passage through said level control valve.

4. A rotisserie for cooking articles of food with automatic basting comprising a container, heating means adjacent at least one wall of said container, a closed receptacle in said container adapted to be rotated therein, means for rotating said container, floating level control valve means in said receptacle admitting fluid into the interior of the receptacle from said container, a pressure chamber in said receptacle created by said floating level valve, a liquid discharge tube delivering fluid from said receptacle to a point spaced above said receptacle, said tube receiving said article to be cooked, heating means for said receptacle and a fluid dispersing member on the top of said tube distributing fluid radially outwardly and downwardly from said tube.

5. A culinary sprinkling apparatus as claimed in claim 1 wherein the fluid distributing member is provided with discharge means in annular form which distributes the fluid downwardly in cylindrical sheet like form.

References Cited

UNITED STATES PATENTS

| | | | |
|---|---|---|---|
| 910,318 | 1/1909 | Schaefer | 99—346 |
| 962,529 | 6/1910 | Rose | 222—67 X |
| 1,339,625 | 5/1920 | Holloway | 99—346 |
| 1,819,301 | 8/1931 | Noble | 99—346 |

M. HENSON WOOD, JR., *Primary Examiner.*

M. Y. MAR, *Assistant Examiner.*